(12) United States Patent
LoRocco et al.

(10) Patent No.: US 8,534,273 B2
(45) Date of Patent: Sep. 17, 2013

(54) QUICK CONNECT/DISCONNECT STABILIZER ASSEMBLY FOR ARCHERY BOWS

(75) Inventors: Paul LoRocco, Dallas, TX (US); Damon Lamont Coalson, Dallas, TX (US)

(73) Assignee: TruGlo, Inc., Richardson, TX (US)

( * ) Notice: Subject to any disclaimer, the term of this patent is extended or adjusted under 35 U.S.C. 154(b) by 152 days.

(21) Appl. No.: 13/226,794

(22) Filed: Sep. 7, 2011

(65) Prior Publication Data

US 2013/0055998 A1    Mar. 7, 2013

(51) Int. Cl.
  *F41B 5/20*  (2006.01)
  *F16B 13/06*  (2006.01)
  *F41B 5/14*  (2006.01)
  *F16B 13/12*  (2006.01)

(52) U.S. Cl.
  CPC ............. *F41B 5/1426* (2013.01); *F16B 13/124* (2013.01)
  USPC ................... 124/89; 124/86; 124/88; 411/44; 411/61

(58) Field of Classification Search
  CPC .............................. F41B 5/1426; F16B 13/124
  USPC ............................. 124/86, 88, 89; 411/44, 61
  See application file for complete search history.

(56) References Cited

U.S. PATENT DOCUMENTS

| | | | |
|---|---|---|---|
| 3,412,725 A * | 11/1968 | Hoyt, Jr. ........................ | 124/84 |
| 3,524,441 A * | 8/1970 | Jeffery ........................... | 124/89 |
| 3,742,809 A * | 7/1973 | Zifferer ......................... | 411/61 |
| 4,245,612 A * | 1/1981 | Finlay ............................ | 124/89 |
| 4,258,768 A * | 3/1981 | Pamer et al. .................. | 152/176 |
| 4,615,327 A * | 10/1986 | Saunders ....................... | 124/89 |
| 5,038,510 A * | 8/1991 | Duke .............................. | 43/4 |
| 5,090,396 A * | 2/1992 | Bickel et al. ................... | 124/89 |
| 5,297,533 A * | 3/1994 | Cook .............................. | 124/88 |
| 5,339,793 A * | 8/1994 | Findley ......................... | 124/89 |
| 5,388,563 A * | 2/1995 | Hsu ................................ | 124/23.1 |
| 5,513,622 A * | 5/1996 | Musacchia, Sr. ............. | 124/89 |
| 5,520,164 A * | 5/1996 | Huddleston ................... | 124/86 |
| 5,558,078 A * | 9/1996 | Dunlap .......................... | 124/89 |
| 5,613,484 A * | 3/1997 | Troncoso ...................... | 124/89 |
| 5,657,741 A * | 8/1997 | Todd .............................. | 124/89 |
| 5,911,215 A * | 6/1999 | Fisher, Jr. ..................... | 124/86 |
| 6,179,510 B1 * | 1/2001 | Meicke et al. ................ | 403/306 |
| 6,431,163 B1 * | 8/2002 | Chipman ....................... | 124/89 |
| 6,568,382 B2 * | 5/2003 | Martin et al. ................. | 124/86 |
| 7,958,881 B2 * | 6/2011 | Silverson ...................... | 124/86 |

* cited by examiner

*Primary Examiner* — Gene Kim
*Assistant Examiner* — Alexander Niconovich
(74) *Attorney, Agent, or Firm* — Alvin R. Wirthlin

(57) ABSTRACT

A stabilizer assembly adapted for quick connection to and disconnection from an archery bow includes a mounting base adapted for connection to the archery bow, a locking member and a stabilizer body. The mounting base is generally cup-shaped and includes a rear wall that is adapted for connection to the archery bow and a continuous side wall that extends from the rear wall to form an internal space. The locking member includes an expanding collar that is adapted to be received into the internal space. The stabilizer body has a vibration dampening section and a connecting section. The connecting section is insertable into the expanding collar to thereby cause the collar to expand and releasably connect the stabilizer body to the mounting base.

7 Claims, 7 Drawing Sheets

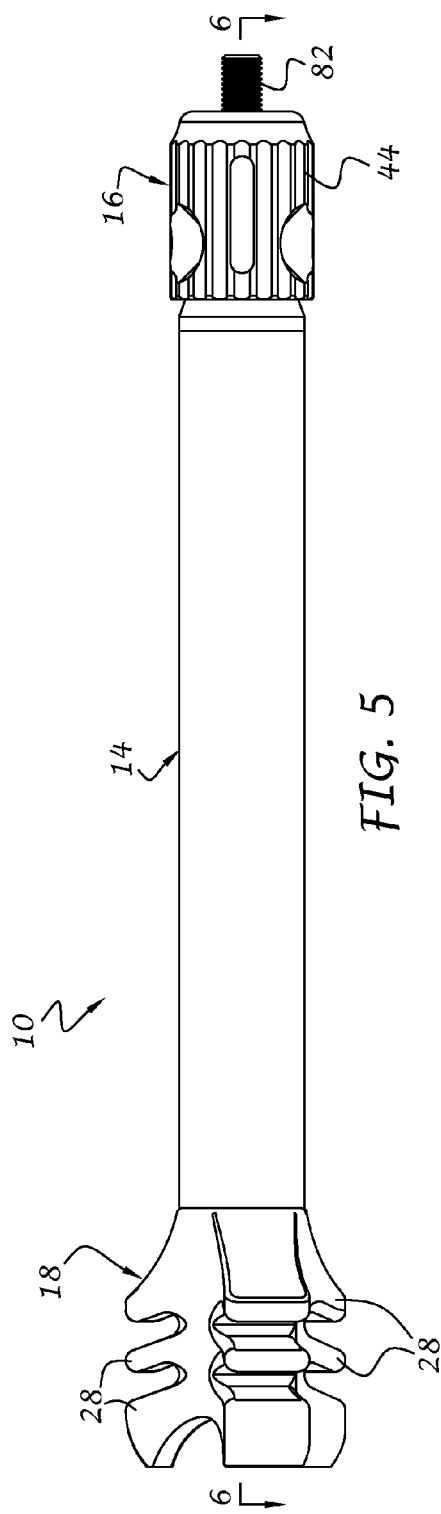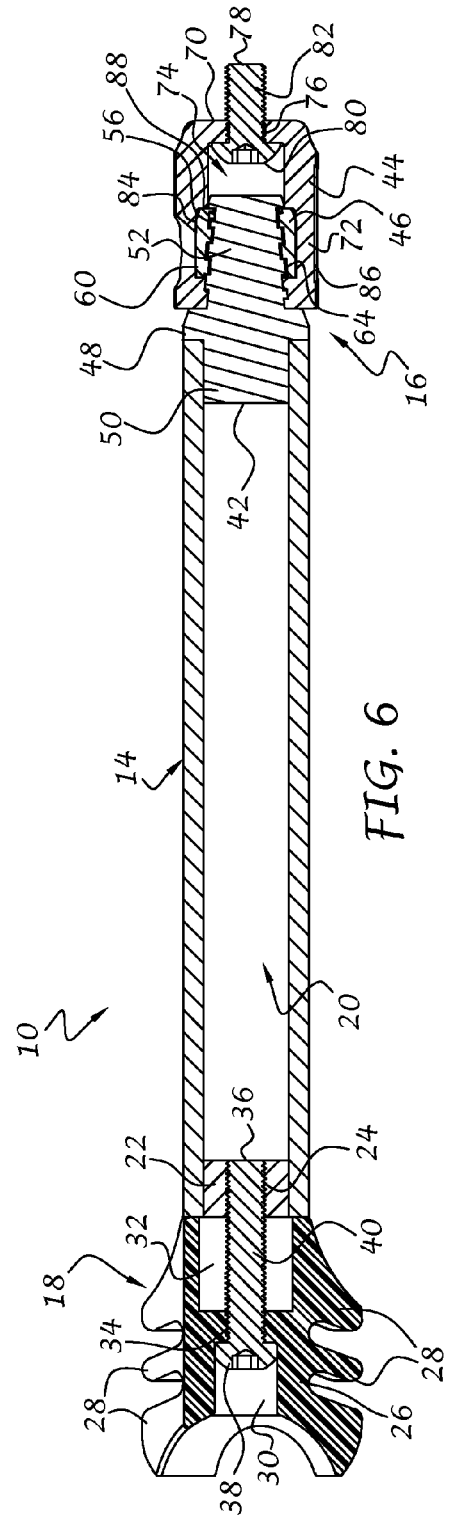

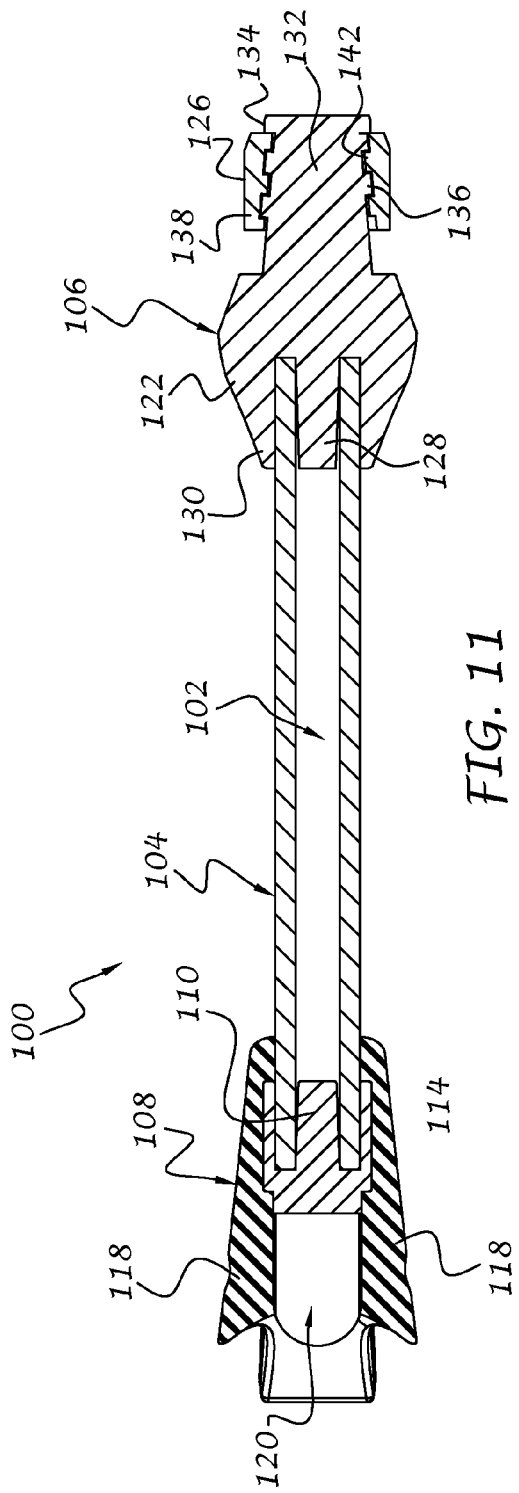
FIG. 11
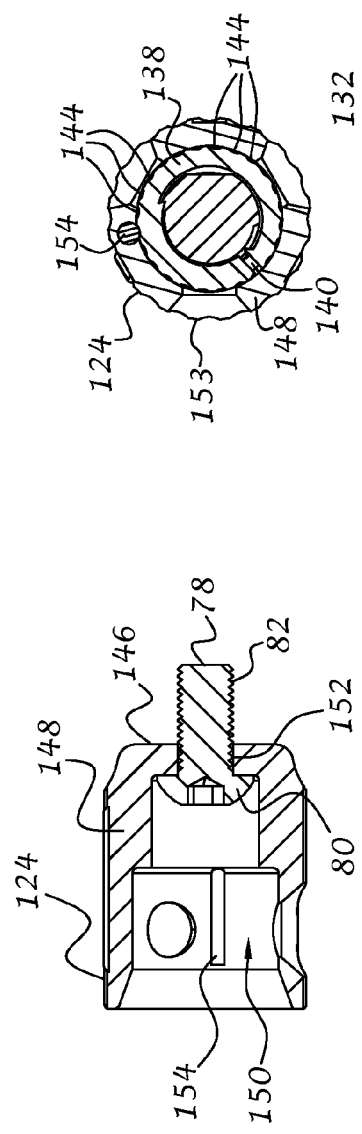
FIG. 13
FIG. 12

US 8,534,273 B2

QUICK CONNECT/DISCONNECT STABILIZER ASSEMBLY FOR ARCHERY BOWS

BACKGROUND OF THE INVENTION

This invention relates generally to accessories for archery bows, and more particularly to a quick-disconnect bow stabilizer assembly.

Many accessories for archery bows are intended to facilitate use of the bow by an archer and improve aiming accuracy. One such accessory is a bow stabilizer which helps to balance the bow and absorbs shock and vibration during shooting, resulting in a more comfortable grip upon release of an arrow and greater shooting accuracy. The stabilizer typically includes a weighted shaft that screws into a threaded bore formed in the riser or handle of the bow and extends forwardly from the bow. The dimensions of many stabilizers are of such a nature that they can be unwieldy during storage and transportation. In use, the stabilizer may become snagged on brush, branches or the like during hunting, while many stabilizers are too large to fit into an archery bow case during transportation. The installation and removal of prior art archery bow stabilizers require tools that must be transported by the user and can be very time-consuming.

It would therefore be desirous to provide an archery bow stabilizer that can be quickly installed and removed. It would be further desirous to provide an archery bow stabilizer that can be installed and removed without the use of hand tools.

SUMMARY OF THE INVENTION

In accordance with one aspect of the invention, a stabilizer assembly adapted for quick connection to and disconnection from an archery bow includes a mounting base adapted for connection to the archery bow; a stabilizer body having a vibration dampening section and a connecting section; and a locking member operably associated with the mounting base and the connecting section to thereby releasably connect the stabilizer body to the mounting base.

In accordance with a further aspect of the invention, a stabilizer assembly adapted for quick connection to and disconnection from an archery bow includes a mounting base adapted for connection to the archery bow, a locking member, and a stabilizer body. The mounting base is generally cup-shaped and includes a rear wall that is adapted for connection to the archery bow and a continuous side wall that extends from the rear wall to form an internal space. The locking member includes an expanding collar that is adapted to be received into the internal space. The stabilizer body has a connecting section. The connecting section is insertable into the expanding collar to thereby cause the collar to expand and releasably connect the stabilizer body to the mounting base.

In accordance with another aspect of the invention, a method of quickly connecting a stabilizer to an archery bow includes attaching a mounting base to an archery bow, the mounting base having an internal space; providing an expandable locking member for engagement with the internal space of the locking member; providing a stabilizer body with a connecting section; and inserting the connecting section into the expandable locking member to thereby expand the expandable locking member into engagement with the internal space and connect the stabilizer body to the archery bow.

BRIEF DESCRIPTION OF THE DRAWINGS

FIG. 5 is a side elevational view thereof;

FIG. 6 is a sectional view of the stabilizer assembly taken along line 6-6 of FIG. 5;

FIG. 11 is a sectional view of the stabilizer assembly taken along line 11-11 of FIG. 10;

FIG. 12 is a sectional view of the mounting base taken along line 12-12 of FIG. 10; and FIG. 13 is a sectional view of a connecting section of the stabilizer assembly inserted into the mounting base taken along line 13-13 of FIG. 9.

It is noted that the drawings are intended to depict only typical embodiments of the invention and therefore should not be considered as limiting the scope thereof. It is further noted that the drawings may not necessarily be to scale. The invention will now be described in greater detail with reference to the accompanying drawings.

DETAILED DESCRIPTION OF THE INVENTION

Figure 1:
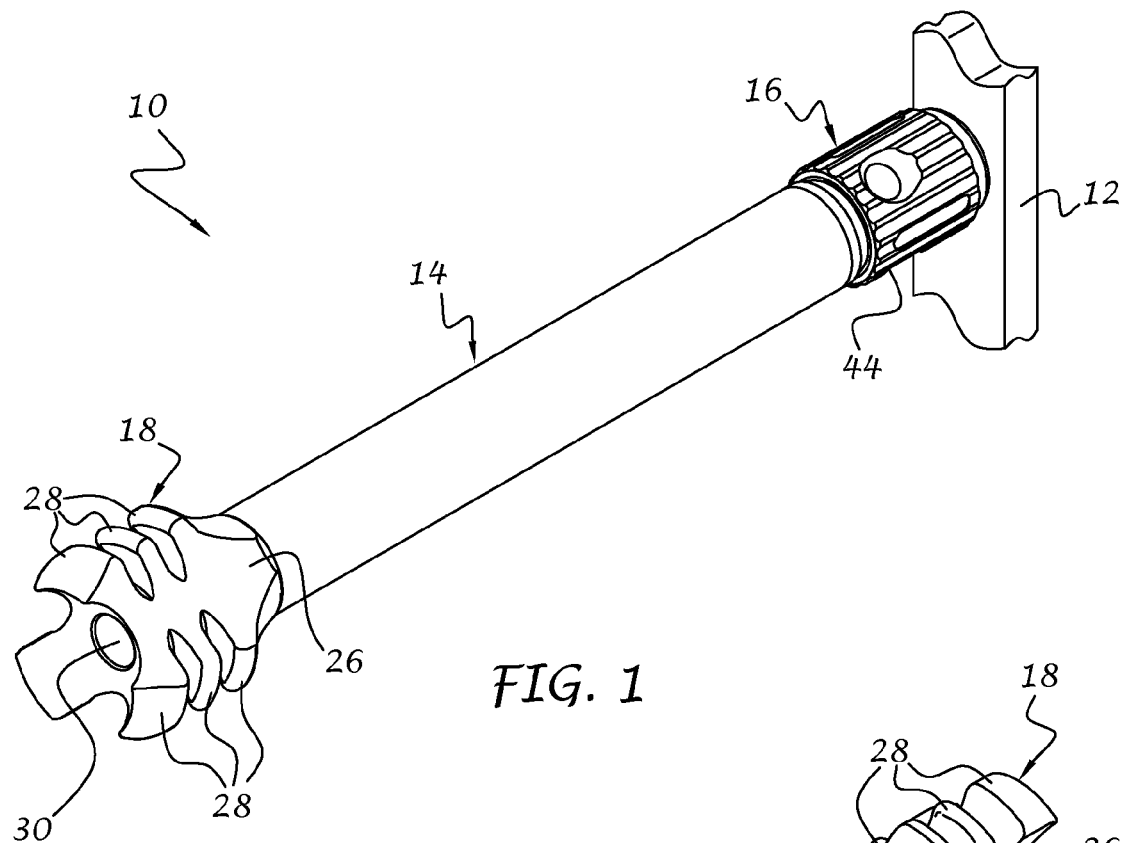
FIG. 1 is a front isometric view of a stabilizer assembly connected to the riser of an archery bow in accordance with the present invention.
Figure 2:
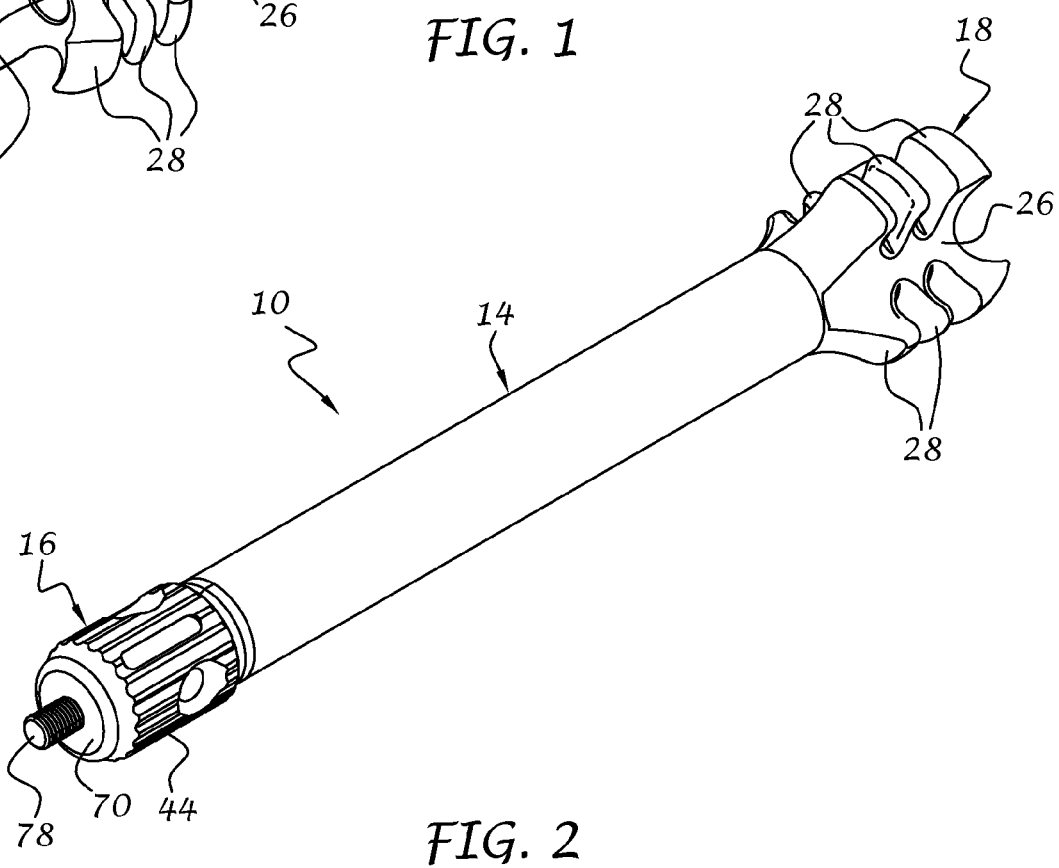
FIG. 2 is a rear isometric view of the stabilizer assembly.
Figure 3:
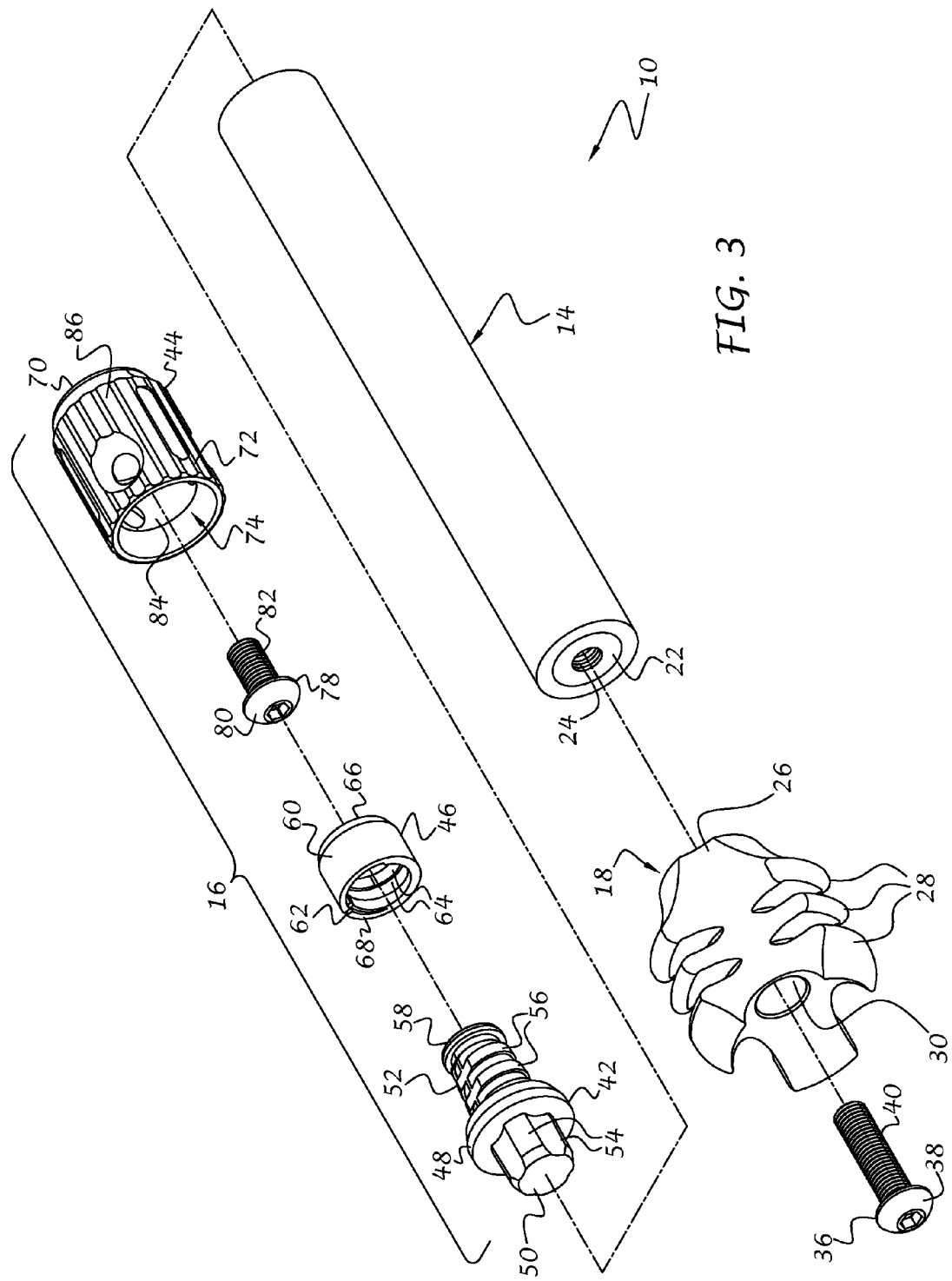
FIG. 3 is an exploded front isometric view of the stabilizer assembly.
Figure 4:
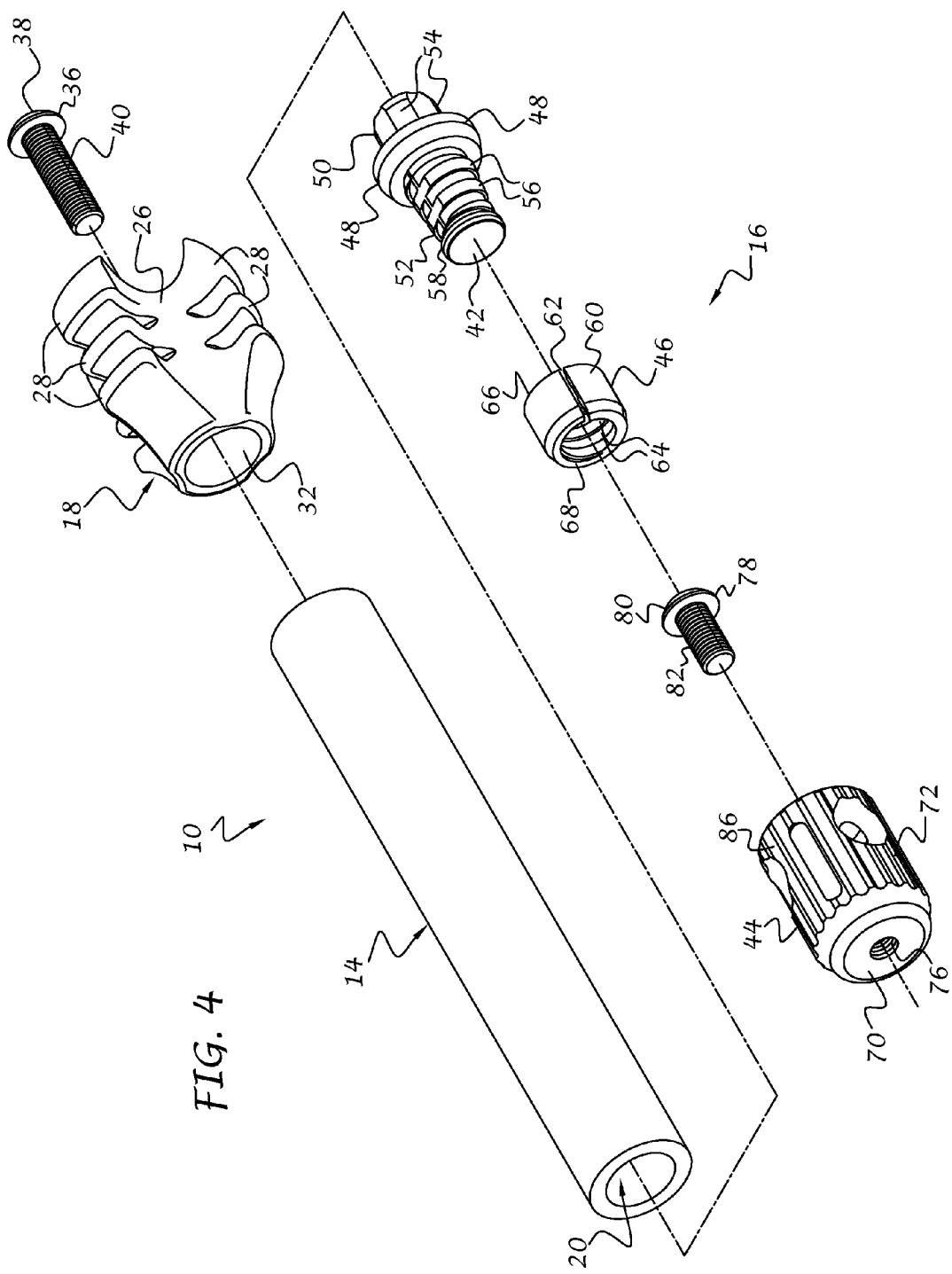
FIG. 4 is an exploded rear isometric view thereof.

Referring now to the drawings, and to FIG. 1 in particular, a stabilizer assembly 10 in accordance with the present invention is illustrated. The stabilizer assembly 10 is adapted for mounting to a threaded aperture (not shown) formed in a riser 12 of an archery bow where a conventional stabilizer would usually be attached. However, it will be understood that the stabilizer assembly 10 can be mounted to the riser or handle or at any other convenient location on the archery bow through straps, adhesives, rivets, cooperative locking members, and/or any other connection means. The present invention is primarily adapted for use with compound bows but may also be used with recurve bows, reflex bows, longbows, and so on.

With additional reference to FIGS. 2-6, the stabilizer assembly 10 preferably includes a stabilizer body 14 with a connecting section 16 extending rearwardly therefrom and a dampening head section 18 extending forwardly therefrom. The stabilizer body 14 is preferably of hollow cylindrical construction and includes a central bore 20 (FIG. 6) for receiving the connecting section 16 and dampening head section 18. An insert 22 (FIGS. 3 and 6) is located at a forward end of the stabilizer body 14 and includes a threaded bore 24 that is sized to receive a threaded fastener 36 for connecting the dampening head section 18 to the stabilizer body. The insert 22 can be mounted to the stabilizer body 14 through any well-known connection means, such as press-fitting, welding, adhesive bonding, and so on. Alternatively, the insert 22 can be eliminated and the threaded bore 24 can be machined or otherwise formed directly in the stabilizer body 14. It will be understood that other means for connecting the dampening head section 18 to the stabilizer body 14 can be used without departing from the spirit and scope of the invention.

The dampening head section 18 preferably includes a body 26 and a plurality of ribs or fingers 28 that extend generally radially outwardly from the body 26. The ribs 28 are preferably provided in sets of three and each set is spaced at approximately 120 degrees around the body 26 from an adjacent set. It will be understood that the dampening head section 18 can be formed with more or less ribs and more or less sets of ribs. It will be further understood that the individual ribs can be replaced with one or more annular ribs that extend completely around the body 26. A forward depression 30 and rearward depression 32 are formed in the body 26. An opening 34 (FIG. 6) is formed in the body 26 and extends between the forward depression 30 and rearward depression 32. A threaded fastener 36 includes a head portion 38 located within the forward depression 30 and a threaded shaft portion 40 that extends from the head portion, through the opening 34 and rearward depression 32, and into the threaded bore 24 of the stabilizer body 14 to thereby connect the dampening head section 18 to the forward end of the stabilizer body. The rearward depression 32 of the dampening head section 18 and central bore 20 of the stabilizer body 14 form a resonance chamber to substantially reduce or eliminate noise and vibration during use of the archery bow. The dampening head section 18 is preferably constructed of a single or unitary piece of relatively soft resilient material for providing a noise and vibration dampening effect during use of the archery bow. Suitable materials can include, but are not limited to, elastomers, polyurethanes, open and closed cell foam materials, plastics, and combinations thereof. It will be understood that the dampening head section 18 can be eliminated and/or replaced with a dampening section located in or on the stabilizer body 14 without departing from the spirit and scope of the invention.

The connecting section 16 preferably includes an adaptor 42 that extends rearwardly from the stabilizer body 14, a mounting base 44 adapted for connection to the riser 12 (FIG. 1) of an archery bow, and a locking member 46 connected to the adaptor 42 and engageable with the mounting base 44 for releasably locking the stabilizer body 14 to the mounting base 44 and thus the archery bow.

The adaptor 42 preferably includes a support portion 48 that abuts the rearward end of the stabilizer body 14, a stem portion 50 that extends forwardly from the support portion into the central bore 20 of the stabilizer body 14, and a locking portion 52 that extends rearwardly from the support portion for engaging the locking member 44. The stem portion 50 preferably includes axially extending ribs 54 that engage the inner surface of the central bore 20. Preferably, the stem portion 50 is press-fit into the central bore 20 so that the adaptor 42 is permanently connected to the stabilizer body 14. However, it will be understood that the adaptor 42 can be attached to the stabilizer body 14 through other well-known connecting means such as mechanical fastening, clamping, welding, adhesive bonding, and so on. It will be further understood that the adaptor 42 can be integrally formed or molded with the stabilizer body 14 without departing from the spirit and scope of the invention. The locking portion 52 preferably includes a retaining flange 58 formed at a rear end thereof and external threads 56 that taper toward the retaining flange 58 from the support portion 48. Preferably, the external threads are generally square-shaped in cross-section and of a relatively coarse pitch for a purpose to be further described below.

The locking member 46 is preferably in the form of a split ring or collar 60 with a slot or gap 62 that allows expansion and contraction of the collar. Internal threads 64 are formed in the collar 60. The internal threads preferably taper from a forward end 66 to a rearward end 68 of the collar and are preferably square-shaped in cross-section to engage the external threads 56 of the locking portion 52 of the adaptor 42. In accordance with a preferred embodiment of the invention, the locking member 46 is installed on the locking portion 52 by expanding the collar 60 until the internal threads clear the retaining flange 58. The locking member 46 is then slid over the locking portion 52 until the rearward end 68 clears the retaining flange 58. The collar 60 is then allowed to return to its normal position with the internal threads 64 engaging the external threads 56. In this manner, the adaptor 42 (and thus the stabilizer body 14) can rotate about a central axis of the stabilizer body 14 while being pulled or pushed axially by the mutually engaging threads.

The mounting base 44 is preferably generally cup-shaped in configuration with a rear wall 70 and a continuous side wall 72 that extends from the rear wall to form in internal space 74. A threaded aperture 76 extends through the rear wall 70. A threaded fastener 78 includes a head portion 80 located within the internal space 74 and a threaded shaft portion 82 that extends from the head portion and rearwardly through the threaded aperture 76 for engaging a threaded aperture (not shown) formed in a riser 12 (FIG. 1) of an archery bow where a conventional stabilizer would usually be attached, to thereby connect the mounting base 44 to the riser 12. The knurled outer surface 86 of the mounting base 44 facilitates screwing the fastener 78 into the threaded aperture (not shown) of the riser 12 to mount the base 44 to the riser 12 or other portion of the archery bow. An internal annular slot or groove 84 is formed in the side wall 72. The groove 84 is sized for receiving the locking member 42 when the locking member is inserted into the internal space 74 and expanded to fill the groove during connection of the stabilizer assembly to the riser 12.

Figure 7:
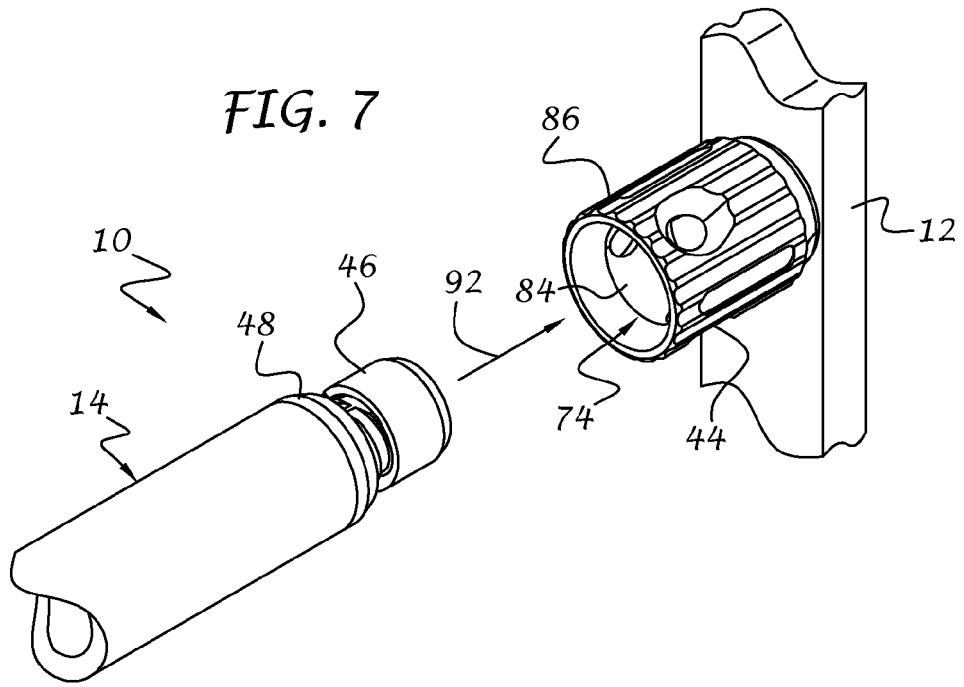
FIGS. 7 and 8 are front isometric views of a portion of the stabilizer assembly showing its quick-connect installation on the riser of an archery bow in accordance with the present invention.
Figure 8:
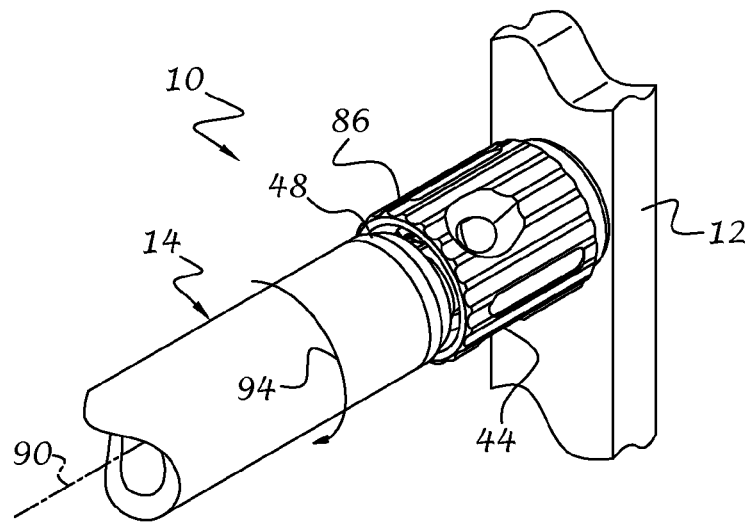

With particular reference to FIGS. 6, 7 and 8, with the fastener 78 installed in the mounting base 44, the mounting base can be installed on the riser 12 or other portion of the archery bow by aligning the threaded shaft portion 82 with the threaded aperture (not shown) of the riser 12 and rotating the mounting base until it is snug against the riser. This can be done by hand without the use of hand tools. If desired, the mounting base 44 can be installed as a permanent fixture on the archery bow and will easily fit into a bow case or the like for transportation and storage without being removed.

The stabilizer body 14 with the dampening head section 18 can then be connected to the mounting base 44 by inserting the locking portion 52 of the adaptor 42 with the attached locking member 46 into the internal space 74 of the mounting base, in a direction as denoted by arrow 92 in FIG. 7, until the rearward end 68 of the locking member 46 abuts an internal shoulder 88 (FIG. 6) of the side wall 72. In this position, with the external threads 56 of the adaptor 42 in engagement with the internal threads 64 of the locking member 46, the stabilizer body 14 is rotated about its central axis 90, as shown by arrow 94 in FIG. 8. During rotation of approximately ¼ to ½ turn about the central axis 90, the mutually engaged tapered threads 56, 64 cause the locking member 46 to expand into the internal annular groove 84 (FIG. 6) to thereby lock the stabilizer body 14 to the mounting base 44. Removal of the stabilizer body 14 from the mounting base 44 can be accomplished by reversing the above procedure. With this arrangement, installation and removal of the stabilizer assembly with respect to the riser can be done without the use of hand tools and is thus greatly facilitated over prior art arrangements to thereby provide a quick connect/disconnect stabilizer assembly for archery bows.

In accordance with a further embodiment of the invention, and by way of example, the locking member 46 can first be installed in the groove 84 of the mounting base so that it cannot be removed without difficulty. Subsequently, the locking portion of the adaptor 42 is inserted into the mounting base and rotated to expand the locking member 46 into locking engagement with both the mounting base and the adaptor.

Figures 9, 10:
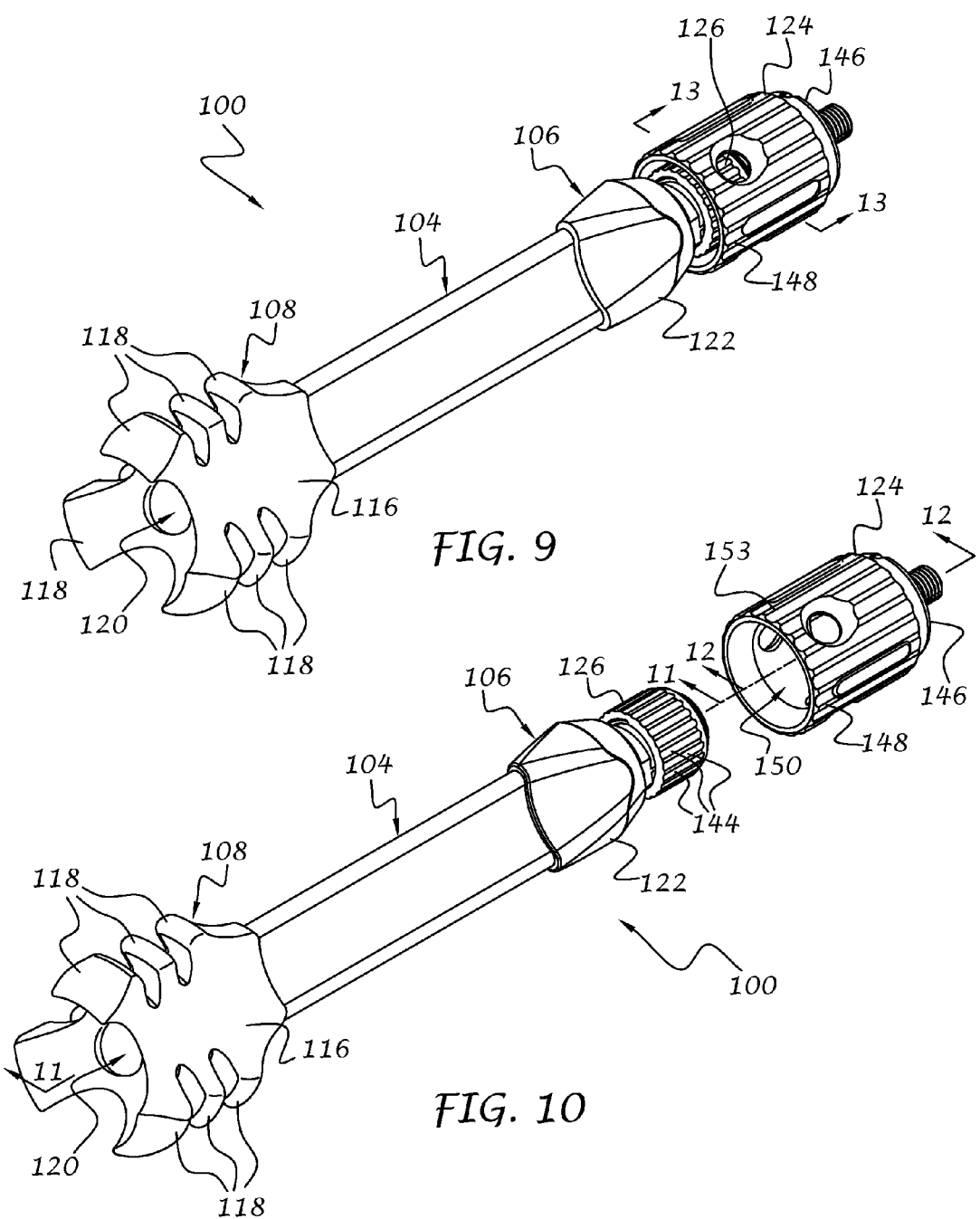
FIG. 9 is a front isometric view of a stabilizer assembly in accordance with a further embodiment of the present invention.
FIG. 10 is a front isometric view of the stabilizer assembly of FIG. 9 with the stabilizer portion oriented for insertion into a mounting base.

Referring now to FIGS. 9-11, a stabilizer assembly 100 in accordance with a further embodiment of the invention is illustrated. The stabilizer assembly 100 preferably includes a stabilizer body 104 with a connecting section 106 extending rearwardly therefrom and a dampening head section 108 extending forwardly therefrom. The stabilizer body 104 is preferably of hollow construction and is triangular in cross section with a central bore 102 (FIG. 11) for receiving the connecting section 106 and dampening head section 108. An insert 110 (FIG. 11) is located at a forward end of the stabilizer body 104 and includes a plug portion 112 that is sized to fit within the bore 102 and a collar portion 114 that fits over the forward end of the stabilizer body 104. The insert 110 can be mounted to the stabilizer body 104 through any well-known connection means, such as friction or press-fitting, welding, adhesive bonding, and so on.

The dampening head section 108 is similar in construction to the dampening head section 18 previously described, and preferably includes a body 116 and a plurality of ribs or fingers 118 that extend generally radially outwardly from the body 116. A bore 120 extends through the body 116 and is shaped to surround the collar portion 114 of the insert 110 and a portion of the stabilizer body 114 to thereby connect the dampening head section 108 to the stabilizer body. The body 116 and insert 110 can be connected together by press-fitting, welding, adhesive bonding, or any other well-known connecting means. As in the previous embodiment, the dampening head section 108 is preferably constructed of a single or unitary piece of relatively soft resilient material for providing a noise and vibration dampening effect during use of the archery bow. It will be understood that the dampening head section 108 can be eliminated and/or replaced with a dampening section located in or on the stabilizer body 104 without departing from the spirit and scope of the invention.

The connecting section 106 preferably includes an adaptor 122 that extends rearwardly from the stabilizer body 104, a mounting base 124 adapted for connection to the riser 12 (FIG. 1) of an archery bow, and a locking member 126 connected to the adaptor 122 and engageable with the mounting base 124 for releasably locking the stabilizer body 104 to the mounting base 124 and thus the archery bow.

The adaptor 122 preferably includes a plug portion 128 (FIG. 11) that is sized to fit within the bore 102 and a collar portion 130 that fits over the rearward end of the stabilizer body 104. The adaptor 122 can be mounted to the stabilizer body 104 through any well-known connection means, such as friction or press-fitting, welding, adhesive bonding, and so on. The adaptor 122 also preferably includes a locking portion 132 that extends rearwardly from the plug and collar portions 128, 130 for engaging the locking member 126. It will be understood that the adaptor 122 can be integrally formed or molded with the stabilizer body 104 without departing from the spirit and scope of the invention. The locking portion 132 preferably includes a retaining flange 134 formed at a rear end thereof and external threads 136 that taper toward the retaining flange 134 from the collar portion 130. Preferably, the external threads are generally square-shaped in cross-section and of a relatively coarse pitch for a purpose to be further described below.

The locking member 126 is preferably similar to the locking member 46 previously described, and includes a split ring or collar 138 with a slot or gap 140 (FIG. 13) that allows expansion and contraction of the collar. Internal threads 142 (FIG. 11) are formed in the collar 138. The internal threads preferably taper from a forward end to a rearward end of the collar and are preferably square-shaped in cross-section to engage the external threads 136 of the locking portion 132 of the adaptor 122. In accordance with a preferred embodiment of the invention, the locking member 126 is installed on the locking portion 132 by expanding the collar 138 until the internal threads 142 clear the retaining flange 134. The locking member 126 is then slid over the locking portion 132 until the rearward end thereof clears the retaining flange 134. The collar 138 is then allowed to return to its normal position with the internal threads 142 engaging the external threads 136. In this manner, the adaptor 122 (and thus the stabilizer body 104) can rotate about a central axis of the stabilizer body 104 while being pulled or pushed axially by the mutually engaging threads. Axially extending grooves 144 are formed on the collar 138 for a purpose to be described in greater detail below.

As best shown in FIG. 12, the mounting base 124 is similar to the mounting base 44 previously described, and is preferably generally cup-shaped in configuration with a rear wall 146 and a continuous side wall 148 that extends from the rear wall to form in internal space 150. A threaded aperture 152 extends through the rear wall 146. A threaded fastener 78 includes a head portion 80 located within the internal space 150 and a threaded shaft portion 82 that extends from the head portion and rearwardly through the threaded aperture 152 for engaging a threaded aperture (not shown) formed in a riser 12 (FIG. 1) of an archery bow where a conventional stabilizer would usually be attached, to thereby connect the mounting base 124 to the riser 12. As in the previous embodiment, the knurled outer surface 153 of the mounting base 124 facilitates screwing the fastener 78 into the threaded aperture (not shown) of the riser 12 to mount the base 124 to the riser 12 or other portion of the archery bow.

An internal projection 154 preferably extends into the internal space 150 from the side wall 148 and axially therealong. The projection is sized for receiving one of the axially extending grooves 144 of the collar 138 when the locking member 126 is inserted into the internal space 150 of the mounting base 124. The engagement between one of the grooves 144 and the projection 154 ensures that the collar 138 does not rotate when the stabilizer body 104 is rotated to expand the collar against the continuous side wall 148 of the mounting base 124. In this manner, the locking member 126 can be inserted into the mounting base 124 at any rotational position then twisted to expand the collar 138 to lockingly engage the side wall 148 of the mounting base, as previously described with respect to the previous embodiment. It will be understood that one or more projections 154 can be formed around the inner surface of the side wall 148 and that one or more grooves can be formed on the collar 138 without departing from the spirit and scope of the invention. It will be further understood that one or more projections can be alternatively formed on the collar 138 and that one or more grooves can alternatively be formed in the side wall 148 without departing from the spirit and scope of the invention.

It will be understood that the term "preferably" as used throughout the specification refers to one or more exemplary embodiments of the invention and therefore is not to be interpreted in any limiting sense. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. By way of example, although the stabilizer body in the above-described arrangements have been shown and described as generally cylindrical and triangular, it will be understood that the stabilizer body can have any cross sectional shape. It will be understood, therefore, that the present invention is not limited to the particular embodiments disclosed, but also covers modifications within the spirit and scope of the invention as defined by the appended claims.

What is claimed is:

1. A stabilizer assembly adapted for quick connection to and disconnection from an archery bow, the stabilizer assembly comprising:
a mounting base being generally cup-shaped and including a rear wall adapted for connection to the archery bow, and a continuous side wall that extends from the rear wall to form an internal space, and;
a stabilizer body having a connecting section that includes an external tapered thread;
an expandable locking member having an internal tapered thread that engages the external tapered thread of the connecting section to thereby cause the locking member to expand when the connecting section is screwed into the locking member to thereby releasably connect the stabilizer body to the mounting base when the locking member is expanded; and
an axially extending groove on one of the locking member and the mounting base and an axially extending projection on the other of the locking member and the mounting base for engaging the groove to thereby prevent unwanted rotation between the locking member and the mounting base when the connecting section is screwed into the locking member.

2. A stabilizer assembly according to claim 1, wherein the locking member comprises a split collar, with the internal tapered thread formed in the collar.

3. A stabilizer assembly according to claim 2, and further comprising an annular groove formed in the side wall for receiving and holding the split collar when the collar is expanded.

4. A stabilizer assembly according to claim 3 wherein the split collar is mounted on the connecting section.

5. A stabilizer assembly according to claim 1, wherein the internal and external threads are formed and tapered such that the locking member is sufficiently expanded to lock the mounting base with the connecting section when the stabilizer body is rotated less than one full revolution about its rotational axis.

6. A stabilizer assembly according to claim 5, wherein the locking member locks the mounting base with the connecting section when the stabilizer body is rotated about one-quarter to one-half revolution about its rotational axis.

7. A stabilizer assembly according to claim 1, wherein the locking member is mounted on the connecting section.

* * * * *